United States Patent
Kamuro et al.

(10) Patent No.: US 8,064,335 B2
(45) Date of Patent: Nov. 22, 2011

(54) COMMUNICATION MONITORING METHOD, COMMUNICATION MONITORING SYSTEM, MANAGEMENT SYSTEM, AND EXTERNAL DEVICE

(75) Inventors: Kyoko Kamuro, Kawasaki (JP); Takaaki Kawakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 12/535,275

(22) Filed: Aug. 4, 2009

(65) Prior Publication Data

US 2010/0034112 A1    Feb. 11, 2010

(30) Foreign Application Priority Data

Aug. 7, 2008  (JP) .................................. 2008-204614

(51) Int. Cl.
*G01R 31/08* (2006.01)
(52) U.S. Cl. ........................................ 370/218; 370/244
(58) Field of Classification Search .................... None
See application file for complete search history.

(56) References Cited

U.S. PATENT DOCUMENTS

| | | | | |
|---|---|---|---|---|
| 7,821,923 B2 * | 10/2010 | Kakadia et al. | | 370/221 |
| 7,849,127 B2 * | 12/2010 | Lindem et al. | | 709/201 |
| 7,860,990 B2 * | 12/2010 | Mallesan et al. | | 709/230 |
| 2006/0274649 A1 * | 12/2006 | Scholl | | 370/218 |
| 2007/0076591 A1 * | 4/2007 | Khan | | 370/216 |
| 2007/0160058 A1 * | 7/2007 | Zhou et al. | | 370/395.2 |
| 2008/0144605 A1 * | 6/2008 | Qiu et al. | | 370/352 |
| 2008/0219268 A1 * | 9/2008 | Dennison | | 370/395.2 |
| 2009/0196183 A1 * | 8/2009 | Kakadia et al. | | 370/237 |

FOREIGN PATENT DOCUMENTS

JP    2001-282761    10/2001

* cited by examiner

*Primary Examiner* — Donald Mills
(74) *Attorney, Agent, or Firm* — Katten Muchin Rosenman LLP

(57) ABSTRACT

A management system for use in a communication monitoring system, exchanging communication check information between external devices, and monitoring communication in the network, the management system including an information manager for managing topology information about each of a number of network apparatuses, representative information about a representative external device connected to a network apparatus connected to the management system, and adjacent information about one or more external devices adjacent to each of the external devices; and an information notifier for notifying each of the external devices of the topology information, the representative information, and the adjacent information supplied from the information manager.

9 Claims, 13 Drawing Sheets

FIG. 5

| OPS/PROBE INFORMATION | IP ADDRESS | PROPERTY |
|---|---|---|
| OPS INFORMATION | 1.1.1.1 | — |
| COMMUNICATION CHECK TARGET PROBE INFORMATION (1) | 1.1.1.2 | R |
| COMMUNICATION CHECK TARGET PROBE INFORMATION (2) | 2.2.2.1 | N1 |
| COMMUNICATION CHECK TARGET PROBE INFORMATION (3) | 2.2.2.2 | N2 |
| ... | | |
| COMMUNICATION CHECK TARGET PROBE INFORMATION (x) | 2.2.2.3 | |

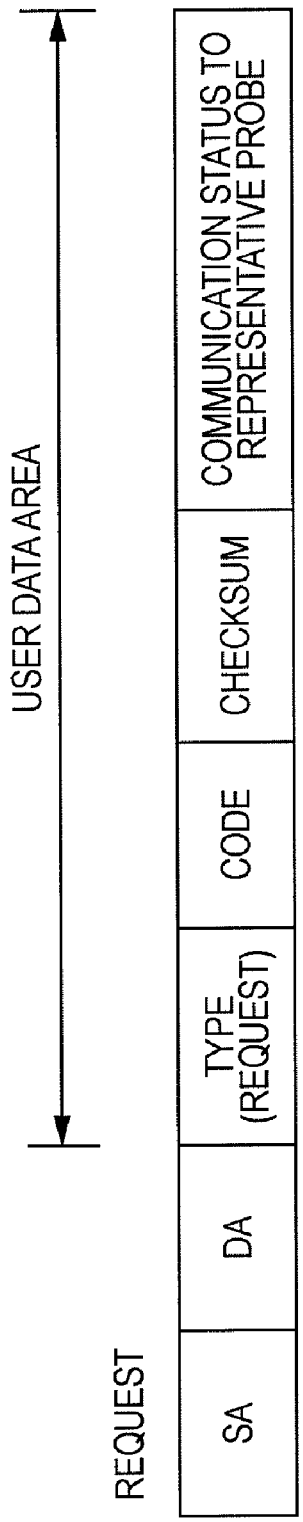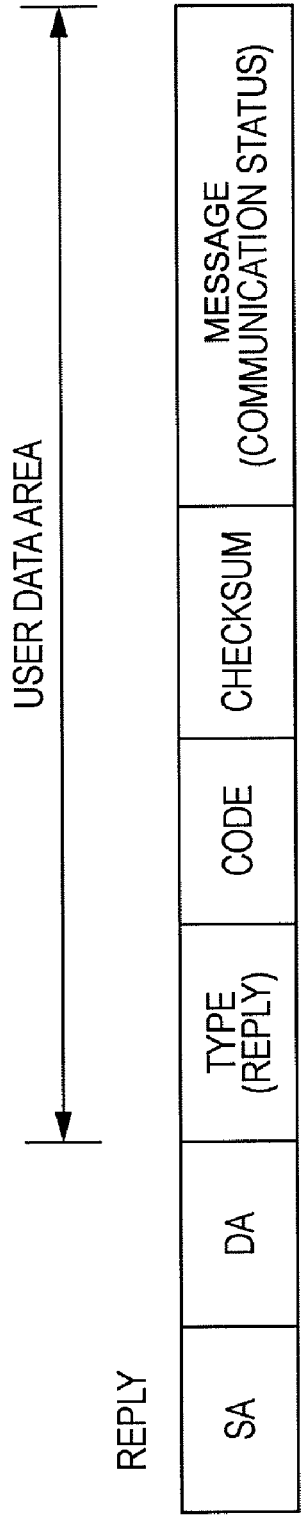

FIG. 7

| OPS/PROBE INFORMATION | IP ADDRESS | COMMUNICATION | PROPERTY | STATUS TO REPRESENTATIVE PROBE |
|---|---|---|---|---|
| OPS INFORMATION | 1.1.1.1 | — | — | — |
| PROBE A | 2.2.2.1 | OK | R | — |
| PROBE B | 2.2.2.2 | OK | | — |
| PROBE D | 2.2.2.4 | OK | N1 | OK |
| PROBE E | 2.2.2.5 | OK | N2 | OK |
| PROBE F | 2.2.2.6 | OK | N3 | OK |
| ... | | | | — |
| COMMUNICATION CHECK TARGET PROBE INFORMATION (x) | 2.2.2.X | OK | | — |

FIG. 9

| OPS/PROBE INFORMATION | IP ADDRESS | COMMUNICATION | PROPERTY | STATUS TO REPRESENTATIVE PROBE |
|---|---|---|---|---|
| OPS INFORMATION | 1.1.1.1 | — | — | — |
| PROBE A | 2.2.2.1 | NG | R | — |
| PROBE B | 2.2.2.2 | OK | | — |
| PROBE D | 2.2.2.4 | OK | N1 | OK |
| PROBE E | 2.2.2.5 | OK | N2 | OK |
| PROBE F | 2.2.2.6 | OK | N3 | OK |
| ... | | | | — |
| COMMUNICATION CHECK TARGET PROBE INFORMATION (x) | 2.2.2.X | OK | | — |

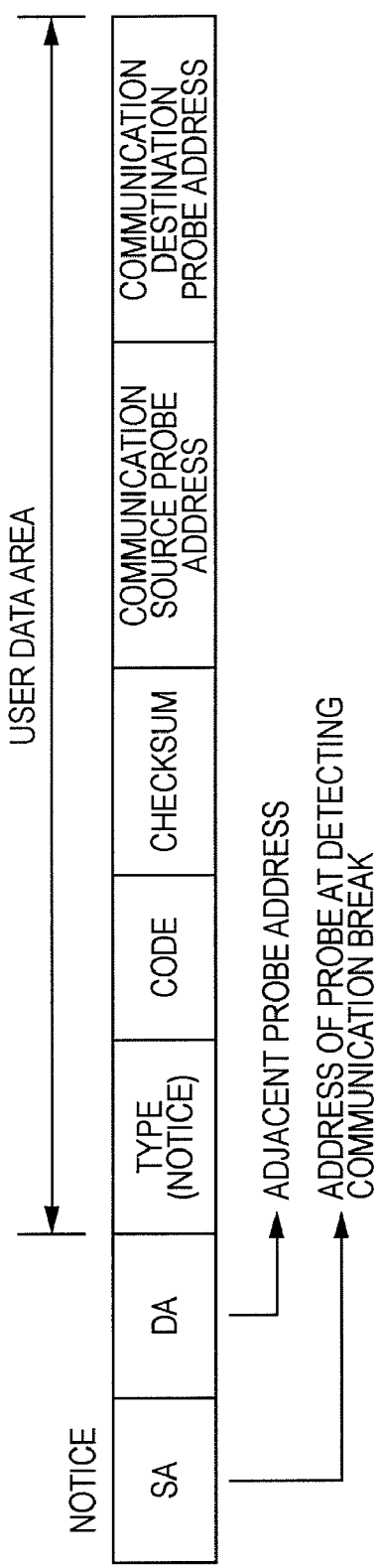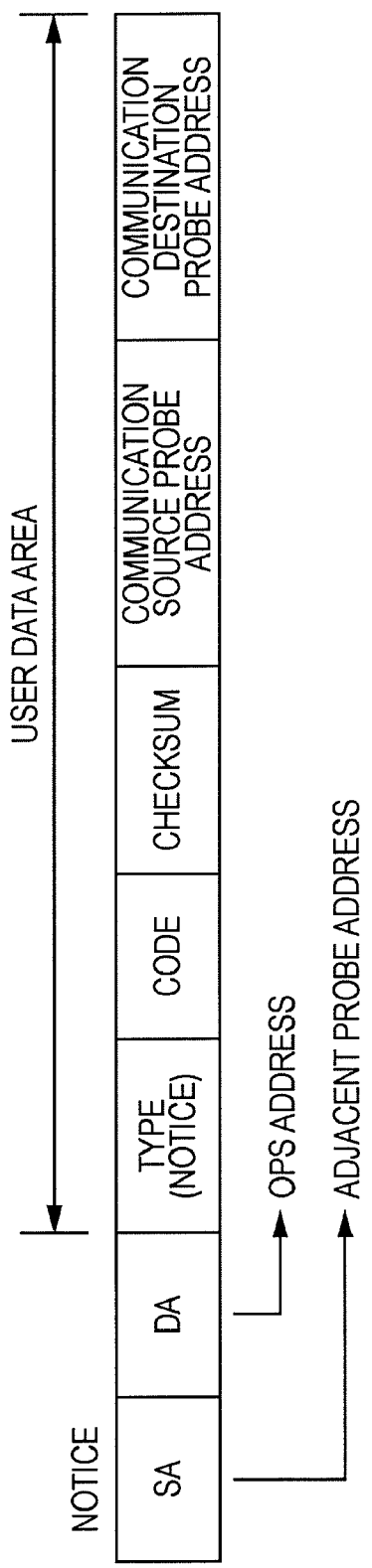

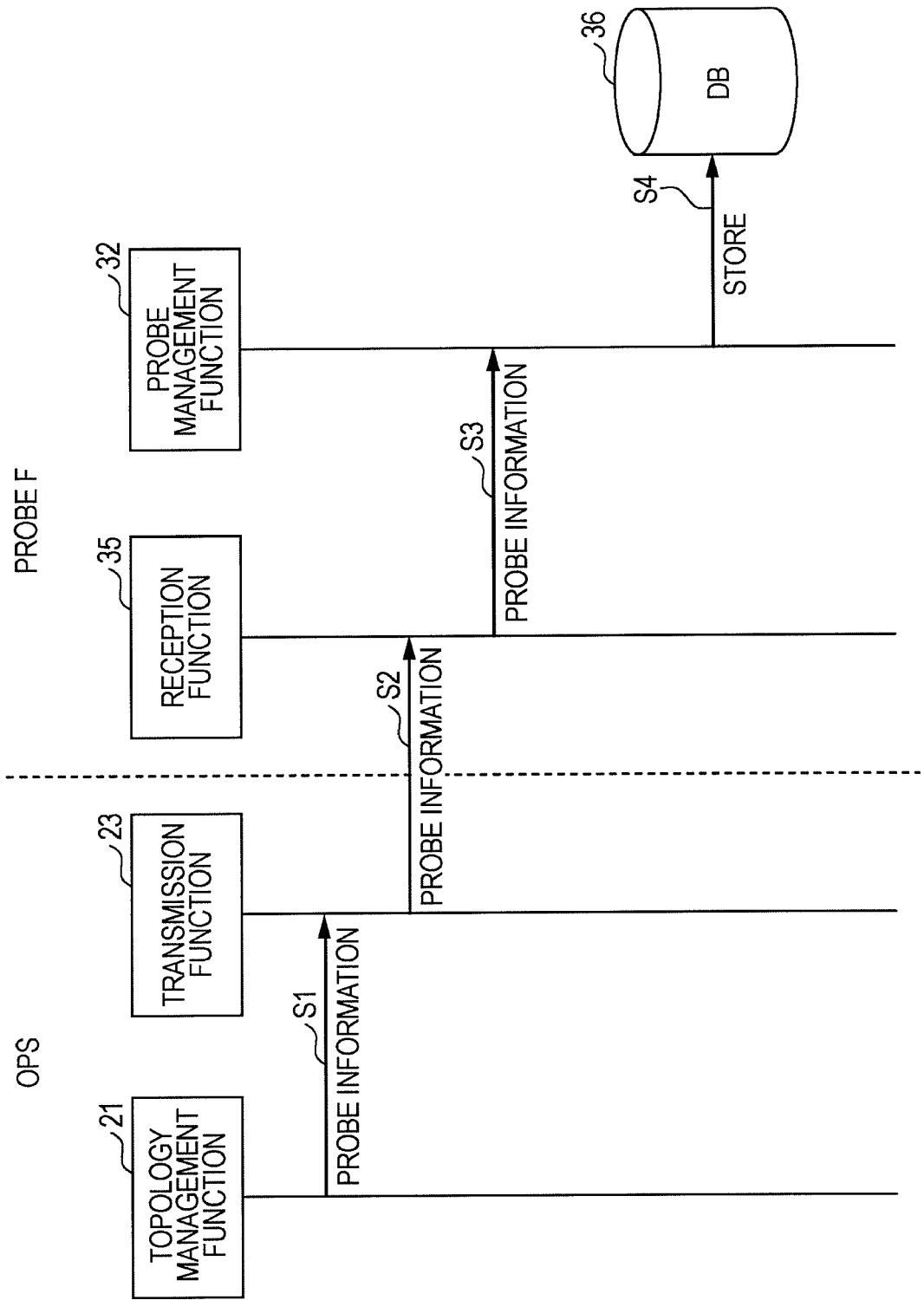

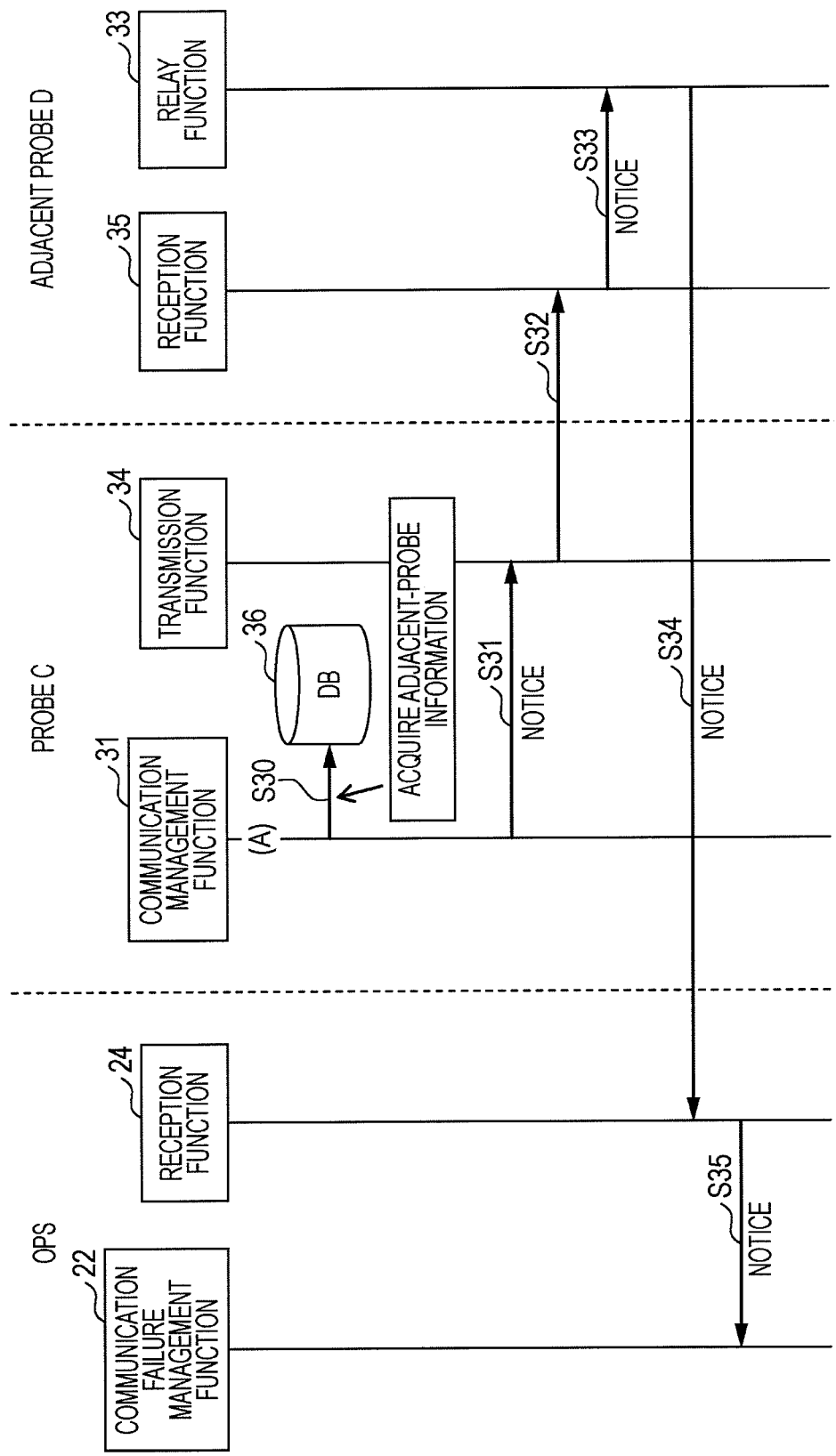

US 8,064,335 B2

COMMUNICATION MONITORING METHOD, COMMUNICATION MONITORING SYSTEM, MANAGEMENT SYSTEM, AND EXTERNAL DEVICE

CROSS-REFERENCE TO RELATED APPLICATION(S)

This application is based upon and claims the benefit of priority of the prior Japanese Patent Application No. 2008-204614, filed on Aug. 7, 2008, the entire contents of which are incorporated herein by reference.

BACKGROUND

1. Field of the Invention

The present invention relates to a communication monitoring method of monitoring network communication, a communication monitoring system, a management system, and an external device.

2. Description of the Related Art

To check end-to-end network communication, the network communication is monitored by use of a probe connected to an edge router at the border of the network.

FIG. 1 illustrates a system configuration of one example of an existing communication monitoring system. In this drawing, edge routers 2a to 2f in a network 1 are connected to probes 3a to 3f, respectively. The edge router 2a is connected to an operation system (OPS) 4 managing the network 1.

The probe 3a connected to the edge router 2a checks communication with all of the other probes 3b to 3f through the network 1. As a result of the checking, when detecting a communication break, the probe 3a notifies the operation system 4 of the communication break. The other probes 3b to 3f check communication in a similar way. When a communication break is detected, the communication break is notified to the operation system 4.

One example of a mechanism for consolidating the management of monitoring results is disclosed in Japanese Unexamined Patent Application Publication No. 2001-282761. With this mechanism, if a health check server and each terminal of a distributed system cannot communicate with one another and the management of health check results is unable to be consolidated, the health check server is changed.

In the illustrated existing communication monitoring system, for example, if there is a failure in the path between the edge routers 2c and 2a being a notification path from the probe 3c to the operation system 4 and a communication break occurs between the probes 3c and 3a, the probe 3c cannot send a notification of confirmation of communication to the operation system 4.

In addition, because a notification to the operation system 4 employs a user datagram protocol (UDP) packet, the notification may be discarded and lost within the network 1. One approach to addressing this is to employ a transmission control protocol (TCP) packet. With this approach, however, a retry repeatedly occurs when a communication break is present, and this results in a significant load on the network 1.

There are other possible approaches to addressing the above problems. For example, a network different from the network 1 may be constructed to be used for a communication path to the operation system 4, or alternatively, the network 1 may be used in an in-band manner by employing a network routing technique.

However, the construction of a different network significantly increases the cost of equipment, and this causes poor economics. With the in-band approach employing a routing technique, because an edge router performs routing for a notification as a result of checking communication, the edge router has an increased load. Additionally, to provide a notification as a result of checking communication in an in-band manner, a high-performance edge router capable of processing an increased amount of processing is necessary, and this leads to poor economics. Furthermore, if the edge router has a silent failure, such as one undetectable by the edge router, routing does not work and the operation system 4 cannot be notified of the communication break.

The present invention is made to solve the above problems. It is an object of a communication monitoring system disclosed herein to provide a method and system of notifying a communication break in an in-band manner without causing poor economics.

SUMMARY

A management system for use in a communication monitoring system, the communication monitoring system connecting each of a plurality of network apparatuses at a border of a network to an external device, connecting a predetermined network apparatus of the plurality of network apparatuses to a management system for the network, exchanging communication check information between the external devices, and monitoring communication in the network, the management system comprises: information managing means for managing topology information about each of the plurality of network apparatuses, representative information about a representative external device connected to a network apparatus connected to the management system, and adjacent information about one or more external devices adjacent to each of the external devices; and information notifying means for notifying each of the external devices of the topology information, the representative information, and the adjacent information supplied from the information managing means.

BRIEF DESCRIPTION OF THE DRAWINGS

FIG. 5 illustrates probe information that contains OPS information according to one embodiment;

FIGS. 6A and 6B illustrate a communication check request packet and a communication check reply packet, respectively, according to one embodiment;

FIG. 7 illustrates one state of a communication check table;

FIG. 9 illustrates another state of the communication check table;

FIG. 10 illustrates a communication check notice packet according to one embodiment;

FIG. 11 illustrates another communication check notice packet according to one embodiment;

FIG. 12 illustrates a sequence of notifying probe information according to one embodiment;

FIG. 15 illustrates a sequence of checking communication (NG).

DESCRIPTION OF THE PREFERRED EMBODIMENTS

Embodiments are described below with reference to the drawings.

Summary of Embodiments

The present embodiment has a configuration described below to allow an operation system to be notified of a communication break even if a notification path from a probe to the operation system is broken. Communication information between a representative probe connected to an edge node connected to the operation system and each of a number of probes is contained in a communication check request packet for each of the probes, and thus the probes share a path in which the probes and the edge node can communicate with each other. Each of the probes retains a communication status with the representative probe in its communication check table, and a notification of a communication break is sent and relayed using the communication check table. That is, (1) A probe adjacent to an operation system is set as a representative probe, and the operation system notifies probes of adjacent probe information; (2) Each of the probes checks communication with the representative probe and retains communication status; (3) A communication status between a probe and the representative probe is contained in a communication check request packet regularly exchanged between the probes, and the communication status is notified to one or more adjacent probes; and (4) In notifying the operation system of a communication break, if communication with the representative probe is in a broken state, the communication break is notified to the operation system via an adjacent probe.

<Configuration of Communication Monitoring System>

Figure 1:
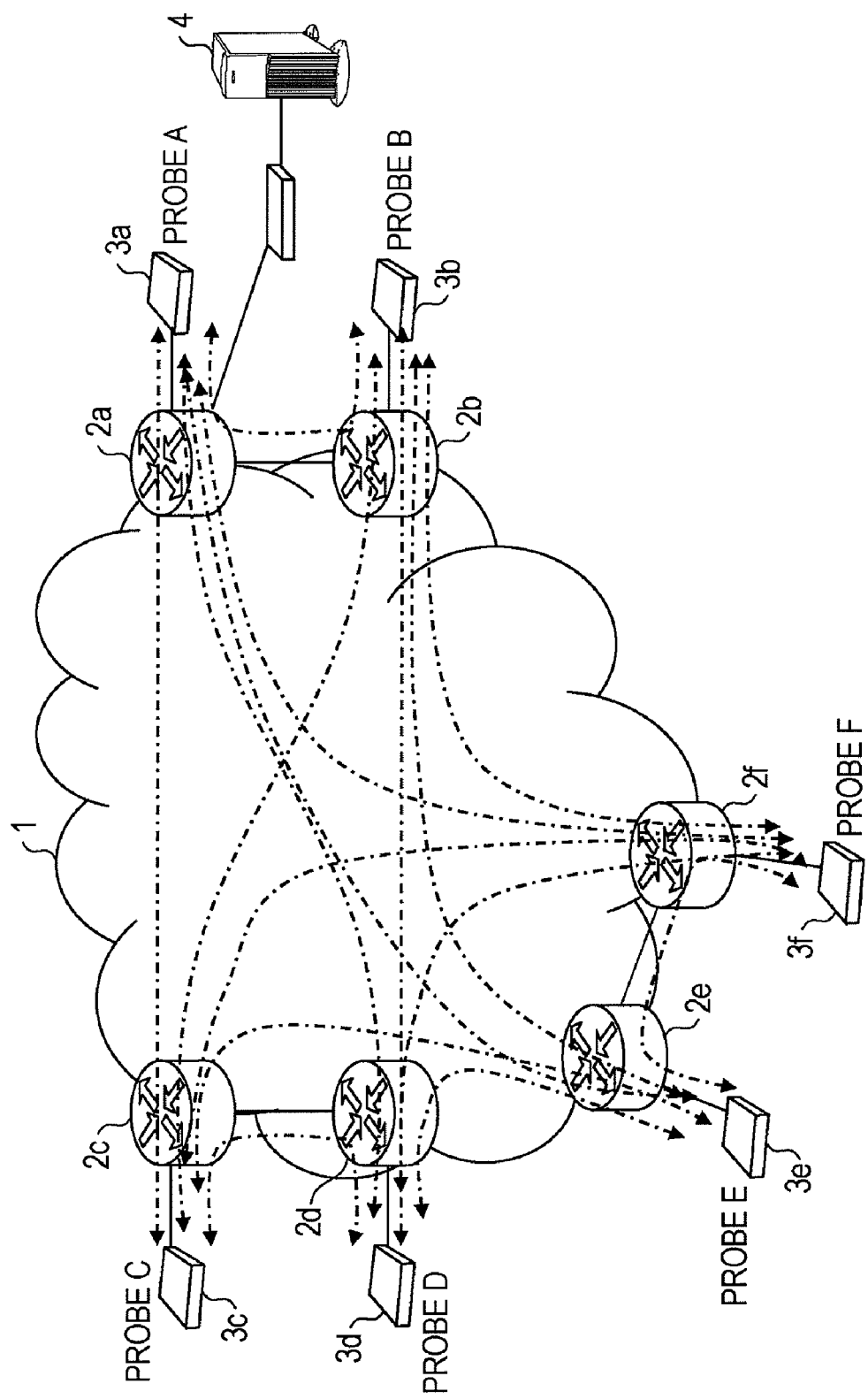
FIG. 1 is a system configuration of one example of an existing communication monitoring system.
Figure 2:
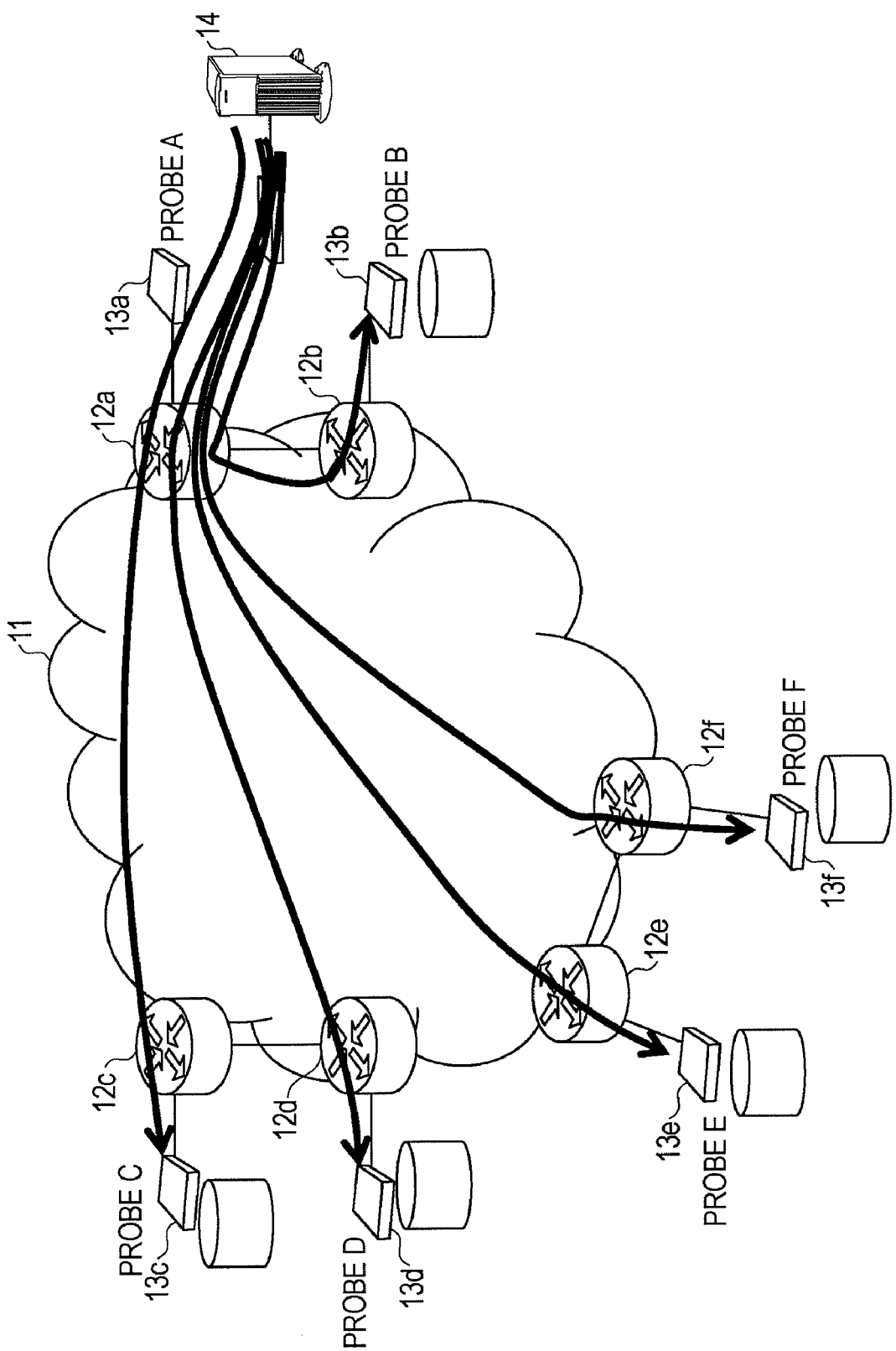
FIG. 2 is a system configuration of a communication monitoring system according to one embodiment.

FIG. 2 illustrates a system configuration of a communication monitoring system according to one embodiment. In this drawing, edge routers 12a to 12f in a network 11 are connected to probes 13a to 13f, respectively. The edge router 12a is connected to an operation system (OPS) 14 managing the network 11.

The probe 13a checks communication with all of the other probes 13b to 13f through the network 11. When detecting a communication break, the probe 13a notifies it to the operation system 14. Each of the other probes 13b to 13f checks communication in a similar way. When detecting a communication break, the probe detecting the communication break notifies it to the operation system 14.

The operation system 14 retains topology information indicating the connection relationship between network components (e.g., routers) included in the network 11 and also topology information indicating the connection relationship between probes. The operation system 14 has representative probe information and adjacent probe information about each of the probes.

Information about the probe 13a connected to the edge router 12a connected to the operation system 14 (containing an IP address) is the representative probe information. Information about a second probe connected to a second edge router adjacent to a first edge router connected to a first probe (containing an IP address) is the adjacent probe information for the first probe. The IP address of the operation system is OPS information.

<Configuration of Operation System>

Figure 3:
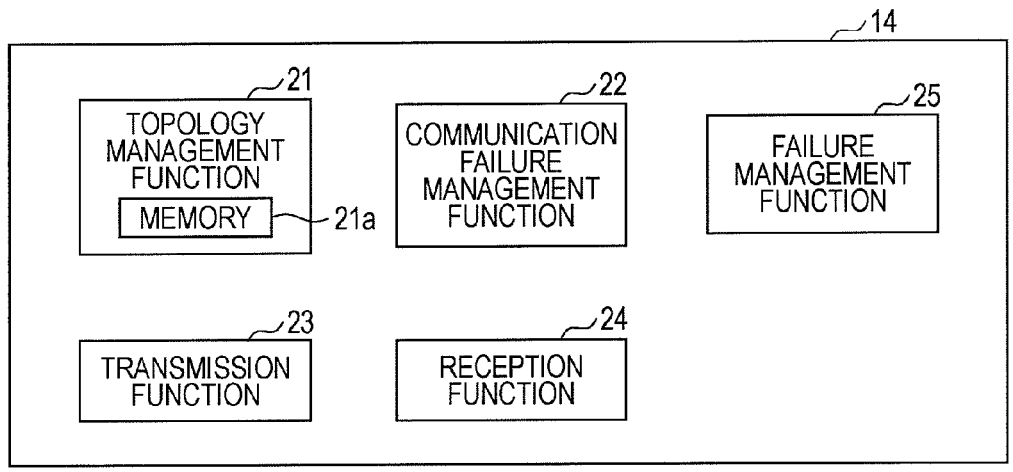
FIG. 3 is a functional diagram of an operation system according to one embodiment.

FIG. 3 illustrates a functional diagram of the operation system 14 according to one embodiment. In this drawing, a topology management function 21 manages topology of probes. That is, the topology management function 21 stores in advance topology information about the probes 13a to 13f and the representative probe information and the adjacent probe information about each of the probes 13a to 13f in an internal memory 21a. The topology management function 21 notifies each of the probes 13a to 13f of probe information containing OPS information (topology information, representative probe information, and adjacent probe information).

Information about the probe 13a connected to the edge router 12a connected to the operation system 14 (containing an IP address) is the representative probe information. Information about a second probe connected to a second edge router adjacent to a first edge router connected to a first probe (containing an IP address) is the adjacent probe information for the first probe. The IP address of the operation system is OPS information.

A communication failure management function 22 manages communication failure information notified by the probes 13a to 13f and notifies it to a failure management function 25.

A transmission function 23 sends a packet of the probe information containing OPS information (topology information, representative probe information, and adjacent probe information) to each of the probes 13a to 13f.

A reception function 24 receives a packet of the communication failure information from each of the probes 13a to 13f and notifies it to the communication failure management function 22.

The failure management function 25 manages a failure occurring in the network 11 and shows a managed failure to an operator using, for example, a display and a printer.

<Configuration of Probe>

Figure 4:
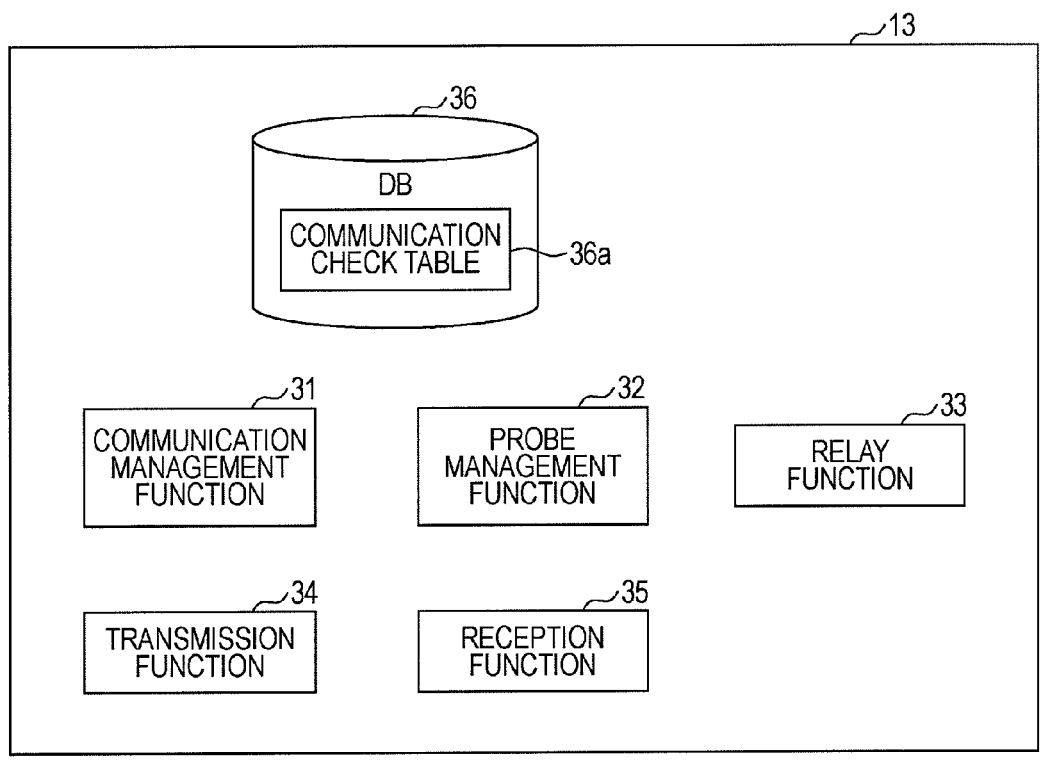
FIG. 4 is a functional diagram of a probe according to one embodiment.

FIG. 4 illustrates a functional diagram of a probe 13 having the same configuration as in the probes 13a to 13f according to one embodiment.

In this drawing, a communication management function 31 generates a communication check request packet for probes in the network 11 managed by a probe management function 32. The communication check request packet is sent to the probes by a transmission function 34. The communication management function 31 checks a communication check reply packet received by a reception function 35 and stores it as communication check result information in a database (DB) 36. When a communication check reply packet in response to the communication check request packet is not acquired in a predetermined period of time, the communication management function 31 detects a communication break and generates a communication check notice packet indicating a notification of the communication break. The communication check notice packet is sent to the operation system 14 by the transmission function 34.

The probe management function 32 stores probe information containing OPS information notified by the operation system 14 in a communication check table 36a of the database 36.

When receiving a communication check notice packet, a relay function 33 generates a communication check notice packet to be sent to the operation system 14, and the communication check notice packet is sent to the operation system 14 by the transmission function 34.

The transmission function 34 sends a communication check request packet and a communication check notice packet.

The reception function 35 receives a communication check request packet or a packet of probe information containing OPS information and checks the type of a received packet.

When the packet is a communication check reply (Type=Reply), the reception function 35 notifies the communication management function 31. When the packet is a communication check notice (Type=Notice), the reception function 35 notifies the relay function 33. In the case of probe information, the reception function 35 notifies the probe management function 32.

<Notification of Probe Information>

FIG. 5 illustrates probe information containing OPS information according to one embodiment. The probe information is transmitted from the operation system 14 to all of the probes 13a to 13f as indicated by the arrows illustrated in FIG. 2 for example, upon start-up of the communication monitoring system. The probe information is set in the communication check table 36a in the database 36 of each of the probes 13a to 13f.

In FIG. 5, the OPS information indicates the IP address of the operation system 14. In the communication check target probe information, for a probe (e.g., 13a) among all of the probes 13a to 13f connected to the network, the IP address and the property of each of the other probes (e.g., 13b to 13f) are set. The property "R" represents a representative probe. The property "N" represents an adjacent probe, and the number subsequent to "N" represents the priority. The smaller the number, the higher the priority.

<Communication Check>

After probe information containing OPS information supplied from the operation system 14 is set in the communication check table 36a, each of the probes 13a to 13f sends a communication check request packet to all of the probes indicated in the communication check target probe information in the communication check table 36a and receives a communication check reply packet in response to the request.

FIGS. 6A and 6B illustrate a communication check request packet and a communication check reply packet, respectively, according to one embodiment.

In the communication check request packet illustrated in FIG. 6A, the source address (SA), destination address (DA), type (Type=Request), code, checksum, and communication status between a probe and the representative probe are set.

In the communication check reply packet illustrated in FIG. 6B, the source address (SA), destination address (DA), type (Type=Reply), code, checksum, and message (communication status) are set.

Each of the probes stores the communication status between the probe and the representative probe set in the communication check request packet received from an adjacent probe in the status to representative probe field in the communication check table 36a illustrated in FIG. 7. For a probe (sender) from which the communication check reply packet is received, "OK" is stored in the communication field in the communication check table 36a illustrated in FIG. 7.

FIG. 7 illustrates one example state of the communication check table 36a of the probe 13c after the probe 13c transmits and receives communication check request packets. The table includes the IP address field, the communication field, the property field, and the status to representative probe field with respect to the operation system 14 (OPS information) and with respect to the probes 13a, 13b, and 13d to 13f (communication check target probe information), which are the probes other than the probe 13c.

In FIG. 7, the communication check reply packets are received from all of the probes 13a, 13b, and 13d to 13f other than the probe 13c, and thus all of the communication fields thereof indicates "OK." The adjacent probes 13d, 13e, and 13f can communicate with the representative probe, and the status to representative probe fields thereof indicate "OK."

Figure 8:
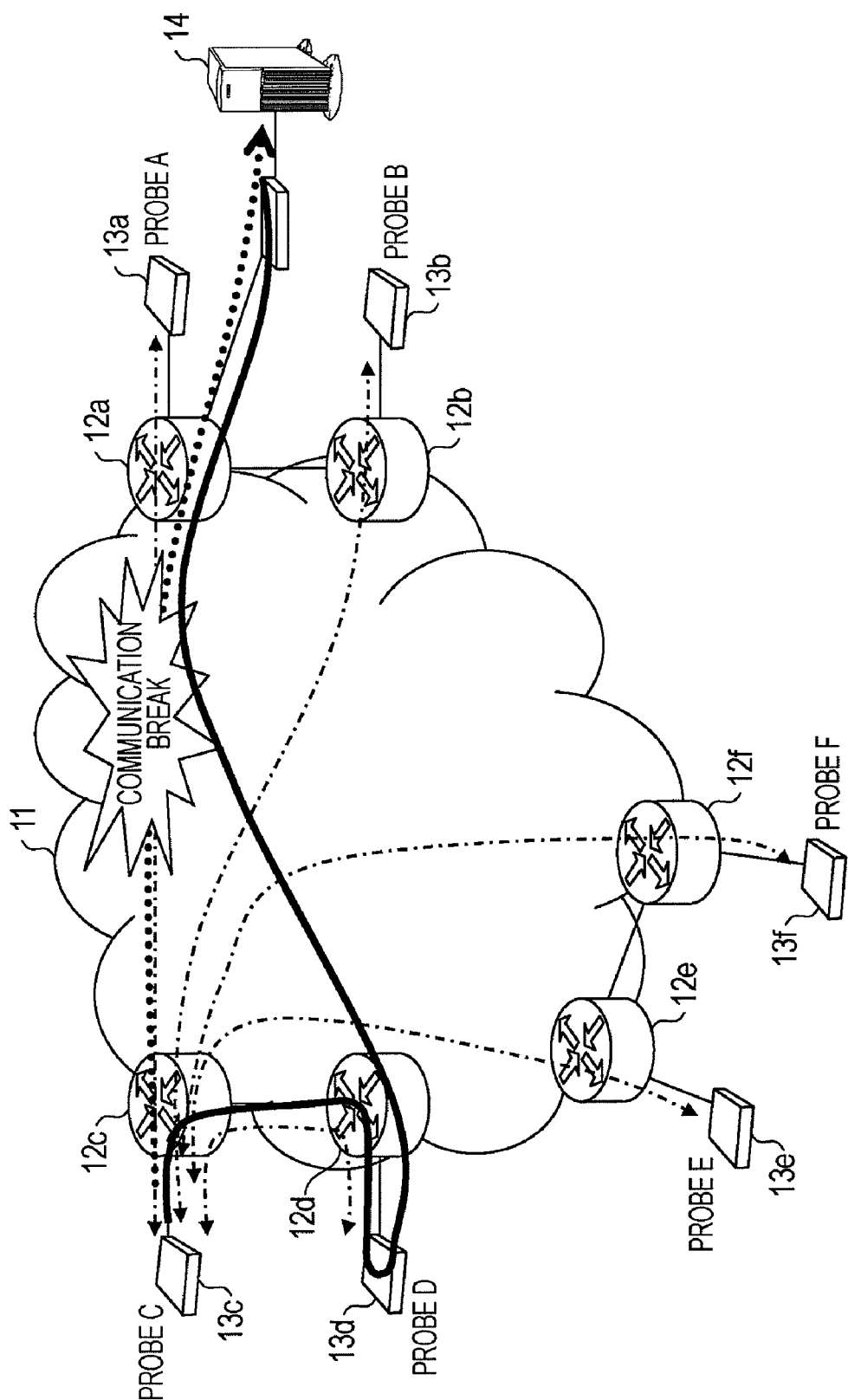
FIG. 8 is an illustration for use in describing a communication break.

Here, as illustrated in FIG. 8, when a communication break occurs between the edge routers 12a and 12c, the communication check table 36a of the probe 13c detecting the communication break is illustrated in FIG. 9. In FIG. 9, the communication field corresponding to the probe 13a (representative probe) indicates "NG", which represents the occurrence of a communication break.

The probe 13c detecting the communication break with respect to the representative probe sends the communication check notice packet illustrated in FIG. 10 to the probe 13d. The probe 13d has the highest priority among the adjacent probes having "OK" in the status to representative probe field in the communication check table 36a.

In the communication check notice packet illustrated in FIG. 10, the source address (SA), destination address (DA), type (Type=Notice), code, checksum, communication source probe address, and communication destination probe address are set. Here, the source address (SA) is the address of the probe 13c detecting the communication break, and the destination address (DA) is the address of the adjacent probe 13d. The communication source probe address is the address of the probe 13c, and the communication destination probe address is the address of the probe 13a.

When receiving the above-described communication check notice packet illustrated in FIG. 10, the probe (adjacent probe) 13d converts the communication check notice packet illustrated in FIG. 10 into the communication check notice packet illustrated in FIG. 11 using the relay function 33 and sends it to the operation system 14.

In FIG. 11, the source address (SA) is the address of the probe (adjacent probe) 13d, and the destination address (DA) is the address of the operation system 14. The settings of the type (Type=Notice), code, checksum, communication source probe address, and communication destination probe address are the same as in FIG. 10.

<Sequence of Notifying Probe Information>

FIG. 12 illustrates a sequence of notifying probe information. In this drawing, in step S1, the topology management function 21 reads the representative probe information, adjacent probe information, and OPS information with respect to a probe and supplies the read information to the transmission function 23. In step S2, the transmission function 23 generates a packet of the above probe information containing the OPS information and sends it to the relevant probe (e.g., 13f).

In step S3, the reception function 35 of the destination probe 13f receives the packet of the probe information containing the OPS information and notifies the probe management function 32. In step S4, the probe management function 32 stores the probe information containing the OPS information in the communication check table 36a of the database 36.

<Sequence of Checking Communication>

Figure 13:
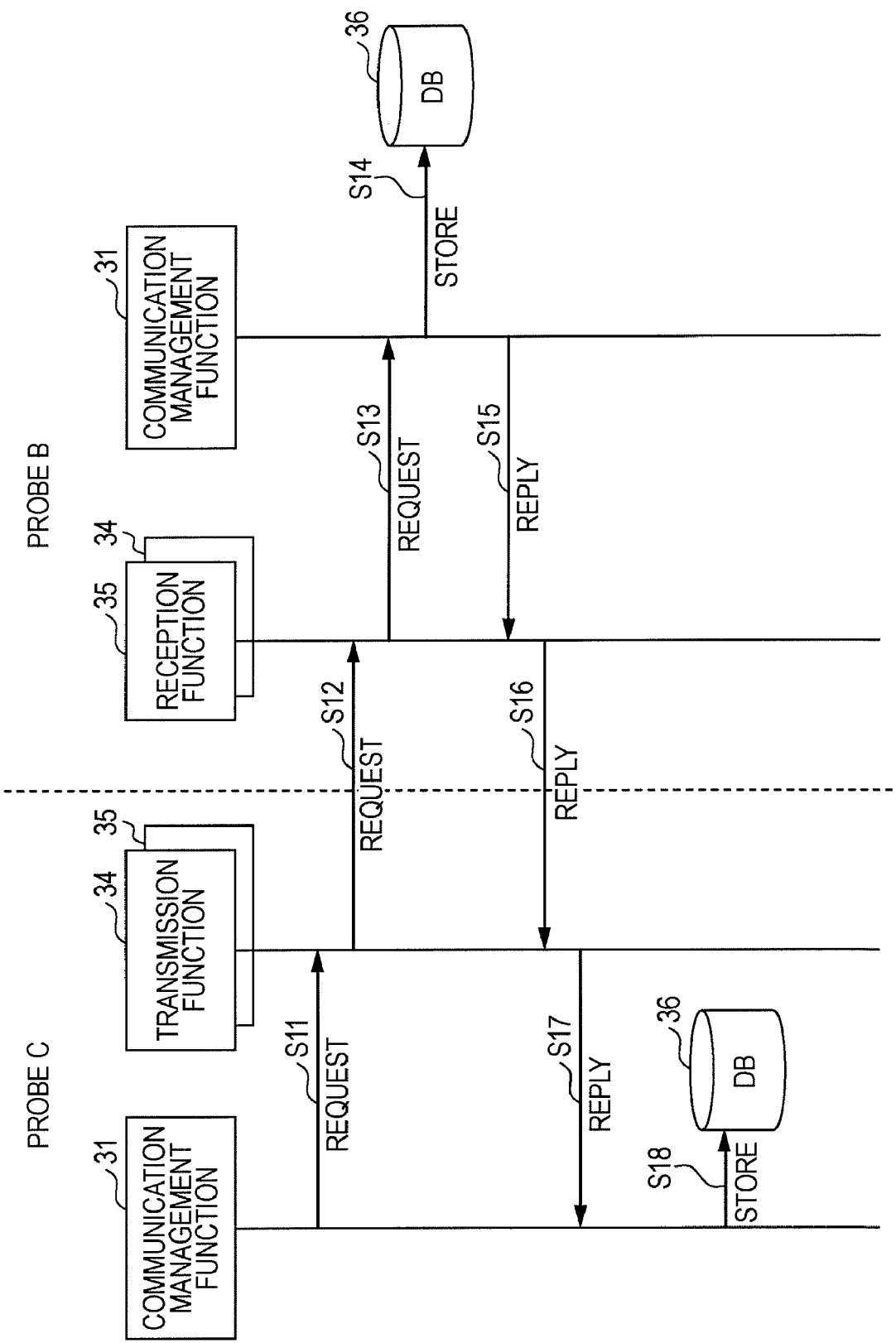
FIG. 13 illustrates a sequence of checking communication (OK) according to one embodiment.

FIG. 13 illustrates a sequence of checking communication (OK) according to one embodiment.

In this drawing, in step S11, the communication management function 31 of, for example, the probe 13c generates a communication check request packet for, for example, the probe 13b managed by the probe management function 32 and notifies the transmission function 34. In step S12, the transmission function 34 sends the communication check request packet to that probe.

In step S13, the reception function 35 of the destination probe 13b receives the communication check request packet and notifies the communication management function 31. In step S14, the communication management function 31 stores the communication status between itself (the probe 13b) and the representative probe or probe 13c in the status to representative probe field in the communication check table 36a.

In step S15, the communication management function 31 generates a communication check reply packet to be sent in response to the communication check request packet and notifies the transmission function 34. In step S16, the transmission function 34 sends the communication check reply packet to the probe 13c, which is the return destination.

In step S17, the reception function 35 of the return-destination probe 13c receives the communication check reply packet and notifies the communication management function 31. In step S18, the communication management function 31 stores "OK" in the communication field corresponding to the probe being the sender of the received communication check reply packet in the communication check table 36a.

Figure 14:
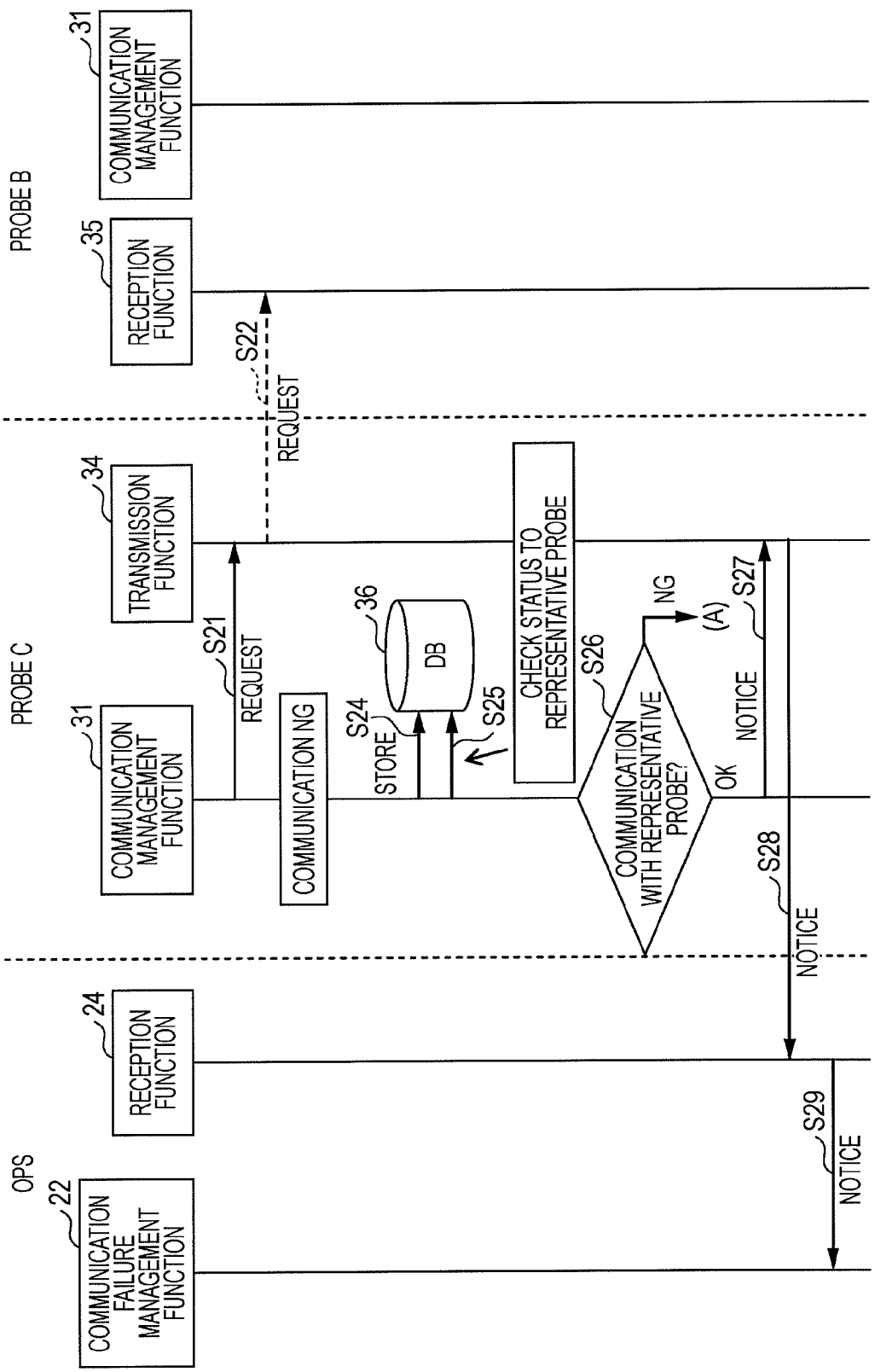
FIG. 14 illustrates a sequence of checking communication (NG) according to one embodiment.

FIGS. 14 and 15 illustrate a sequence of checking communication (NG) according to one embodiment.

In FIG. 14, in step S21, the communication management function 31 of, for example, the probe 13c generates a communication check request packet for, for example, the probe 13b managed by the probe management function 32 and notifies the transmission function 34. In step S22, the transmission function 34 sends the communication check request packet to that probe.

If communication between the edge routers 12c and 12b in the network 11 is broken, and a communication check reply packet is not received from the probe 13b to the probe 13c even after a predetermined period of time has passed after the transmission of the communication check request packet from the probe 13c toward the probe 13b, in step S24, the communication management function 31 of the probe 13c stores "NG" in the communication field corresponding to the probe 13b, to which the communication check request packet has been sent, in the communication check table 36a.

In step S25, the communication management function 31 refers to the communication field corresponding to the representative probe 13a having the property "R" in the communication check table 36a to check the status of the communication with the representative probe 13a. After that, in step S26, the communication management function 31 determines whether the status of the communication with the representative probe 13a is "OK." When it is "OK," in step S27, the communication management function 31 generates the communication check notice packet illustrated in FIG. 11 and notifies the transmission function 34. In step S28, the transmission function 34 sends the communication check notice packet to the operation system 14.

In step S29, the reception function 24 of the operation system 14 receives the communication check notice packet and notifies the communication failure management function 22.

In step S26, when the status of the communication with the representative probe 13a is "NG," the processing proceeds to step S30 illustrated in FIG. 15. In step S30, the communication management function 31 refers to the status to representative probe field in the communication check table 36a and checks the status to the representative probe with respect to the adjacent probes.

Then, in step S31, the communication management function 31 generates the communication check notice packet illustrated in FIG. 10 for the probe 13d having the highest priority among the adjacent probes having "OK" in the status to representative probe field in the communication check table 36a and notifies the transmission function 34. In step S32, the transmission function 34 sends the communication check notice packet to the adjacent probe 13d.

In step S33, the reception function 35 of the probe 13d receives the above communication check notice packet and notifies the relay function 33. In step S34, the relay function 33 converts the communication check notice packet illustrated in FIG. 10 into the communication check notice packet illustrated in FIG. 11 and sends it to the operation system 14.

In step S35, the reception function 24 of the operation system 14 receives the communication check notice packet and notifies the communication failure management function 22.

With the above embodiment, the communication status between the probes can be reliably notified to the operation system without use of an advanced routing technology in a network. This facilitates the introduction of the communication monitoring system. In addition, the use of the in-band system, which does not require an advanced routing technology, eliminates the necessity of investment in a network.

A communication break caused by a silent failure, which is undetectable by an edge router itself, can also be identified by exchange of a communication check request packet and a communication check reply packet. Accordingly, even if a silent failure occurs, a path that connection is confirmed can be selected. Even when a probe notifies the operation system of the communication break using a TCP packet, resending does not occur, and it can prevent an excessive load on the network.

The invention claimed is:

1. An external device for use in a communication monitoring system, the communication monitoring system coupling each of a plurality of network apparatuses at a border of a network to such an external device, coupling a predetermined network apparatus of the plurality of network apparatuses to a management system for the network, the external device comprising:

a table to store information including representative information about a representative external device coupled to the predetermined network apparatus coupled to the management system, adjacent information about one or more adjacent external devices adjacent to a corresponding network apparatus coupled to the external device, and a status of communication between the representative external device and each of the adjacent external devices;

a communication check request transmitter to transmit communication check request information toward the other external devices based on the table;

a communication manager to check communication with each of the other external devices using a reply to the communication check request information from the other external devices;

a communication break transmitter, in a case where the communication is not confirmed by the communication manager, to transmit communication break notice information toward the management system as a destination when the external device and the representative external device can communicate and to transmit communication break notice information toward one of the adjacent external devices as the destination when the communication between the external device and the representative external device is not confirmed; and a relay, when receiving communication break notice information, to change the destination of the communication break notice information to the management system and to transmit the communication break notice information.

2. The external device according to claim 1, wherein the communication check request transmitter sets a communication status between the external device and the representative external device in the communication check request information and transmits the communication check request information.

3. The external device according to claim 1, wherein the adjacent information contains a priority, and the communication break transmitter sets one of the adjacent external devices having a highest priority among one or more of the adjacent external devices that can communicate with the corresponding network apparatus as the destination of the communication break notice information.

4. A communication monitoring method of a plurality of external devices in a communication monitoring system, the communication monitoring system coupling each of a plurality of network apparatuses at a border of a network to one of the plurality of external devices, coupling a predetermined network apparatus of the plurality of network apparatuses to a management system for the network, the communication monitoring method comprising:

in a case where a communication break occurs between at least two of the external devices, transmitting communication break notice information from an external device detecting the communication break toward the management system as a destination when the external device detecting the communication break and a representative external device coupled to the predetermined network apparatus coupled to the management system can communicate;

transmitting the communication break notice information from the external device detecting the communication break toward an adjacent one of the external devices as the destination, the adjacent external device being able to communicate with the external device detecting the communication break, to transmit the communication break notice information to the management system when the external device detecting the communication break and the representative external device cannot communicate; and changing, by the adjacent external device receiving the communication break notice information, the destination of the communication break notice information to the management system and transmitting the communication break notice information.

5. The communication monitoring method according to claim 4, further comprising setting a communication status between the external device detecting the communication break and the representative external device in communication check request information to be transmitted toward the other external devices to check communication with each of the other external devices and transmitting the communication check request information.

6. The communication monitoring method according to claim 4, wherein the adjacent external device, to which the communication break notice information is transmitted as the destination, has a highest priority among one or more other adjacent external devices that can communicate with the external device detecting the communication break, to transmit the communication break notice information to the management system when the external device detecting the communication break and the representative external device cannot communicate.

7. A communication monitoring system coupling each of a plurality of network apparatuses at a border of a network to one of a plurality of external devices, coupling a predetermined network apparatus of the plurality of network apparatuses to a management system for the network, the communication monitoring system comprising:

in a case where a communication break occurs between at least two of the external devices, transmitting communication break notice information from an external device detecting the communication break toward the management system as a destination when the external device detecting the communication break and a representative external device coupled to the predetermined network apparatus coupled to the management system can communicate;

transmitting the communication break notice information from the external device detecting the communication break toward an adjacent one of the external devices as the destination, the adjacent external device being able to communicate with the external device detecting the communication break, to transmit the communication break notice information to the management system when the external device detecting the communication break and the representative external device cannot communicate; and changing, by the adjacent external device receiving the communication break notice information, the destination of the communication break notice information to the management system and transmitting the communication break notice information.

8. The communication monitoring system according to claim 7, further comprising setting a communication status between the external device detecting the communication break and the representative external device in communication check request information to be transmitted toward the other external devices to check communication with each of the other external devices and transmitting the communication check request information.

9. The communication monitoring system according to claim 7, wherein the adjacent external device, to which the communication break notice information is transmitted as the destination, has a highest priority among one or more other adjacent external devices that can communicate with the external device detecting the communication break, to transmit the communication break notice information to the management system when the external device detecting the communication break and the representative external device cannot communicate.

* * * * *